(12) United States Patent
Burgin et al.

(10) Patent No.: US 8,060,262 B2
(45) Date of Patent: Nov. 15, 2011

(54) AIRPORT LIGHTING AID SIMULATION SYSTEM

(75) Inventors: Roger W. Burgin, Scottsdale, AZ (US); Blake Wilson, Peoria, AZ (US)

(73) Assignee: Honeywell International Inc., Morristown, NJ (US)

(*) Notice: Subject to any disclaimer, the term of this patent is extended or adjusted under 35 U.S.C. 154(b) by 35 days.

(21) Appl. No.: 12/610,093

(22) Filed: Oct. 30, 2009

(65) Prior Publication Data

US 2011/0106343 A1    May 5, 2011

(51) Int. Cl.
*G06G 7/70* (2006.01)
(52) U.S. Cl. ............. 701/16; 340/971; 340/972; 434/42
(58) Field of Classification Search .............. 701/16; 340/971, 951, 948, 953, 972; 434/38, 42; 362/559
See application file for complete search history.

(56) References Cited

U.S. PATENT DOCUMENTS

| | | | |
|---|---|---|---|
| 4,210,930 A | | 7/1980 | Henry |
| 5,343,395 A | * | 8/1994 | Watts .............................. 701/16 |
| 5,657,009 A | * | 8/1997 | Gordon .......................... 340/968 |
| 6,119,055 A | | 9/2000 | Richman |
| 6,185,486 B1 | | 2/2001 | Labounsky et al. |
| 6,199,008 B1 | * | 3/2001 | Aratow et al. ................. 701/120 |
| 6,591,171 B1 | | 7/2003 | Ammar et al. |
| 6,711,479 B1 | | 3/2004 | Staggs |
| 7,209,053 B2 | | 4/2007 | Gannon |
| 7,216,069 B2 | | 5/2007 | Hett |
| 2007/0005199 A1 | * | 1/2007 | He ................................... 701/16 |
| 2010/0023189 A1 | * | 1/2010 | Suddreth et al. ................ 701/16 |

* cited by examiner

*Primary Examiner* — John Nguyen
*Assistant Examiner* — Brian J Broadhead
(74) *Attorney, Agent, or Firm* — Ingrassia Fisher & Lorenz, P.C.

(57) ABSTRACT

An airport lighting aid simulation system comprises a data storage unit configured to store lighting aid data relating to a plurality of airports. The lighting aid data indicates a type and a location of an airport lighting aid at a runway at each airport. The system also includes a display unit and a processing unit operatively connected to both the data storage device and the display unit. The processing unit is configured to receive an input signal indicative of a target runway, to retrieve a sub-set of the lighting aid data from the data storage unit, the sub-set being indicative of a target runway lighting aid, and to control the display unit to display a target runway description. The system enables a pilot to determine whether a visible runway is the target runway by comparing a view from an aircraft as the aircraft approaches the visible runway with the target runway description.

20 Claims, 6 Drawing Sheets

AIRPORT LIGHTING AID SIMULATION SYSTEM

TECHNICAL FIELD

The present invention generally relates to a system for communicating information to a pilot of an aircraft, and more particularly relates to an airport lighting aid simulation system.

BACKGROUND

Some techniques for displaying simulated airport visual approach glide slope indicators on aircraft cockpit displays are known. Two examples of such techniques are disclosed in U.S. Pat. No. 7,216,069 issued to Hett (hereinafter "Hett") and U.S. Pat. No. 7,209,053 issued to Gannon (hereinafter "Gannon"), both of which are incorporated herein by reference in their entirety. As described in Hett and Gannon, aircraft landing at airports during marginal Visual Meteorological Conditions (VMC) or in situations where there are reduced visual cues (e.g., night flights) are aided by an Instrument Landing System (ILS). An ILS provides a radio beam that originates on the ground at an ILS-equipped airport and generates a glide slope that an aircraft can follow during an instrument approach to the runway. The ILS radio beam is detected by equipment onboard the aircraft and provides lateral, along-course, and vertical guidance to aircraft attempting to land at that airport.

However, some airports do not have an ILS-generated radio glide slope and those that do may, nevertheless, wish to provide additional landing aids. Accordingly, airports may substitute for an ILS and/or provide airport lighting aids in addition to the ILS, as described in the U.S. Federal Aviation Administration's (FAA) publication entitled "Aeronautical Lighting and Other Airport Visual Aids." The airport lighting aids may provide vertical visual approach slope guidance to the runway, which is especially useful during marginal VMC or in situations where there are reduced visual cues. For example, various existing Approach Lighting Systems (ALS) provide techniques that can be used by flight crews to transition from instrument flight to visual flight in order to land. An ALS provides a directional pattern of high intensity signal lights that start at a landing threshold of the runway, and that extend a prescribed distance into the approach area. The signal lights shine upwardly toward the aircraft along the approach slope or glide path and visually guide the pilot during the approach and landing. Some ALSs include sequenced flashing lights which appear to the pilot as a ball of light traveling towards the runway at high speed. Such systems are referred to as Medium intensity Approach Lighting Systems with Runway alignment Indicator Lights (MALSR) and may enable a pilot to laterally align the aircraft with the runway.

A well known airport lighting aid is the Precision Approach Path Indicator (PAPI) system. The PAPI system uses a single row of either two or four light units installed on either side of the runway. The light units are arranged in a line perpendicular to the runway centerline to define the visual glide path angle. Each light unit has a white segment in an upper part of the beam and a red segment in a lower part of the beam, with the segments separated by a pink transition zone. In a two-light PAPI system, the lights are positioned and aimed to produce a signal presentation wherein a pilot in an aircraft that is on or close to the established approach path sees the light unit nearest the runway as red and the second light unit as white. If the aircraft is above the approach path, the pilot sees both light units as white. If the aircraft is below the approach path, the pilot sees both light units as red.

In a four-light PAPI system, the signal presentation is such that a pilot in an aircraft which is on or close to the established approach path, sees the two light units nearest the runway as red, and the two light units farthest from the runway as white. If the aircraft is above the approach path, the pilot sees the light unit nearest the runway as red, and the three light units farthest from the runway as white. If the aircraft is further above the approach path, the pilot sees all of the light units as white. If the aircraft is below the approach path, the pilot sees the three light units nearest the runway as red, and the light unit farthest from the runway as white. If the aircraft is further below the approach path, the pilot sees all of the light units as red.

The Visual Approach Slope Indicator (VAST) system is another well known airport lighting aid system. VASI system installations are typically two, four, six, twelve or sixteen lights arranged parallel to the runway centerline or as bars (commonly referred to as near, middle and far bars). Typical VASI installations can be two bars, near and far, and may include two, four, or twelve lights units. Two-bar VASI installations provide one visual glide path which is normally set at three degrees. Some VASI installations are three bars spaced intermittently along one or both sides of the runway, near, middle and far, to provide an additional visual glide path to accommodate high cockpit aircraft. Three-bar VASI installations provide two visual glide paths. The lower glide path is provide by the near and middle bars and is typically set at three degrees, while the upper glide path, which is provided by the middle and far bars, is typically one quarter of a degree higher. This higher glide path is intended for use only by high cockpit aircraft to provide a sufficient Threshold Crossing Height (TCH). VASI installations having two, four, or six light units are located on only one side of the runway and may be installed on either side. If a VASI installation includes twelve or sixteen light units, they may be located on both sides of the runway.

Another known airport lighting aid system uses a tri-color lighting technique. Typically, tri-color visual approach slope indicators are arranged as a single light unit that projects a three-color visual approach path into the final approach area of the runway. The below glide path indication is red, the above glide path indication is amber, and the on glide path indication is green.

A fourth known airport lighting aid system uses a pulsating light. The visual approach slope indicators are arranged as a single light unit that projects a two color visual approach path into the final approach area of the runway. The on glide path indication is a steady white light. The slightly below glide path indication is a steady red light. If the aircraft descends further below the glide path, the red light starts to pulsate. The above glide path indication is a pulsating white light. The pulsating rate increases as the aircraft deviates further above or below the desired glide path.

One challenge facing pilots during flight that is not addressed by the foregoing airport lighting aid systems is the pilot's need to confirm that an airport and/or a runway that is visible from the cockpit of the aircraft is the target airport and/or the target runway, i.e., the airport and runway which have been identified in the pilot's flight plan as the airport and runway at which the aircraft is scheduled to land. Locating the target airport and/or the target runway can be challenging after a long flight, or in geographic regions having multiple and/or closely located airports, or at night, or in cases where pilots become, disoriented, or task saturated, or otherwise confused. Currently, the pilot must refer to a chart comprising one or more pieces of paper that contain information about the target airport and/or the target runway. The pilot must read through the information presented there to learn what type of airport lighting aid is available at the target airport. Then, when the aircraft is close enough to allow the pilot to visually observe the airport lighting aid, the pilot looks out of the cockpit window to visually confirm that the aircraft is approaching the correct airport. This can be a relatively inefficient method of confirming that the aircraft is approaching the target airport and/or the target runway, and, though highly unlikely, could lead to a pilot landing at an incorrect airport or at an incorrect runway at the target airport. If, for example, the pilot's chart simply indicates that the target airport uses a PAPI, then it is postulated that a pilot might conclude that he is approaching the correct airport if the pilot looks out of the cockpit window and sees a runway with a PAPI. This is because many runways use a PAPI and the mere presence of a PAPI at a visible runway is not confirmation that the visible runway is the target runway.

An additional challenge facing pilots is the fact that airport and runway conditions may change during flight. For instances, the target runway or the target airport may close while the aircraft is in flight or the target airport's lighting aid may malfunction. This information will not be available in the pilot's chart. In other instances, while the information may be available to the pilot prior to departure, it is postulated that the pilot may nevertheless fail to observe the warning or may forget the information during flight.

Hett and Gannon each describe systems and methods for simulating an ALS and for displaying the simulated ALS on a display unit in the cockpit of an aircraft. In this manner, Hett and Gannon each provide a system and method to assist the pilot in staying on an appropriate glide slope during the landing phase of a flight. However, neither Hett nor Gannon provide a pilot with an indication as to whether the airport and/or runway which the pilot is approaching is, in fact, the target airport or the target runway. Nor does Hett or Gannon provide a pilot with information pertaining to changed conditions of the target airport and/or runway.

Accordingly, it is desirable to provide a system that enhances a pilot's ability to discern whether a visible airport and/or runway are the target airport and the target runway. In addition, it is desirable to provide a system that dynamically communicates conditions of the target airport and/or target runway to the pilot. Furthermore, other desirable features and characteristics of the present invention will become apparent from the subsequent detailed description of the invention and the appended claims, taken in conjunction with the accompanying drawings and this background of the invention.

BRIEF SUMMARY

Airport lighting aid simulation systems are disclosed herein. In a first non-limiting embodiment, the system includes, but is not limited to, a data storage unit that is configured to store lighting aid data relating to a plurality of airports. The lighting aid data is indicative of a type and of a location of an airport lighting aid that is available at a runway at each airport of the plurality of airports. The system also includes a display unit. The system further includes a processing unit that is operatively connected to the data storage device and to the display unit. The processing unit is configured to receive an input signal that is indicative of a target runway at a target airport. The processing unit is further configured to retrieve a sub-set of the lighting aid data from the data storage unit, the sub-set of the lighting aid data being indicative of a target runway lighting aid. The processing unit is also configured to control the display unit to display a target runway description. In this first embodiment, a pilot is enabled to determine whether a visible runway is the target runway by comparing a view from an aircraft as the aircraft approaches the visible runway with the target runway description.

In a second non-limiting embodiment, the system is compatible for use together with a data link that is configured to provide a message. In this second non-limiting embodiment, the system includes, but is not limited to a data storage unit that is configured to store lighting aid data relating to a plurality of airports. The lighting aid data is indicative of a type and a location of an airport lighting aid that is available at a runway at each airport of the plurality of airports. The system further includes a display unit and a receiver for receiving transmissions from the data link. The system further includes a processing unit that is operatively connected to the data storage device, to the display unit, and to the receiver. The processing unit is configured to receive an input signal that is indicative of a target runway at a target airport. The processing unit is also configured to retrieve a sub-set of the lighting aid data from the data storage unit, the sub-set of the lighting aid data being indicative of a target runway lighting aid. The processing unit is further configured to obtain a target airport message from the receiver. And the processing unit is still further configured to control the display unit to display a target runway description and to display the target airport message. In this second non-limiting embodiment, a pilot is enabled to determine whether a visible runway is the target runway by comparing a view from an aircraft as the aircraft approaches the visible runway with the target runway description.

In a third non-limiting embodiment, the system includes, but is not limited to, a data storage unit that is configured to store lighting aid data relating to a plurality of airports. The lighting aid data is indicative of a type of airport lighting aid available at a runway at each airport of the plurality of airports. The data storage unit is further configured to store approach slope data relating to the plurality of airports. The approach slope data is indicative of an appropriate approach slope to the runway at each airport of the plurality of airports. The system further includes a position determination unit configured to determine a current position of an aircraft. The system also includes a display unit. The system still further includes a processing unit that is operatively connected to the data storage device, to the position determination unit, and to the display unit. The processing unit is configured to receive an input signal indicative of a target runway at a target airport. The processing unit is also configured to retrieve a sub-set of the lighting aid data from the data storage unit, the sub-set of the lighting aid data being indicative of a target runway lighting aid. The processing unit is further configured to retrieve a sub-set of the approach slope data from the data storage unit, the sub-set of the approach slope data being indicative of an appropriate approach slope to the target runway. The processing unit is further configured to retrieve position information from the position determination unit, the position information being indicative of a current position of the aircraft. The processing unit is further configured to compare the position information with the sub-set of the approach slope data to determine whether the aircraft is on the appropriate approach slope to the target runway. The processing unit is still further configured to control the display unit to display a target runway description and to display a pattern of indicators simulating the target runway lighting aid and to illuminate the pattern of indicators in a manner indicative of a deviation of the aircraft from the appropriate approach slope to the target runway. In this third non-limiting embodiment, a pilot is enabled to determine whether a visible runway is the target runway by comparing a view from the aircraft as the aircraft approaches the visible runway with the target runway description. The pilot is further enabled to determine whether the aircraft is on the appropriate approach slope to the target runway by observing the pattern of indicators displayed on the display unit.

BRIEF DESCRIPTION OF THE DRAWINGS

The present invention will hereinafter be described in conjunction with the following drawing figures, wherein like numerals denote like elements.

DETAILED DESCRIPTION

Figure 1:
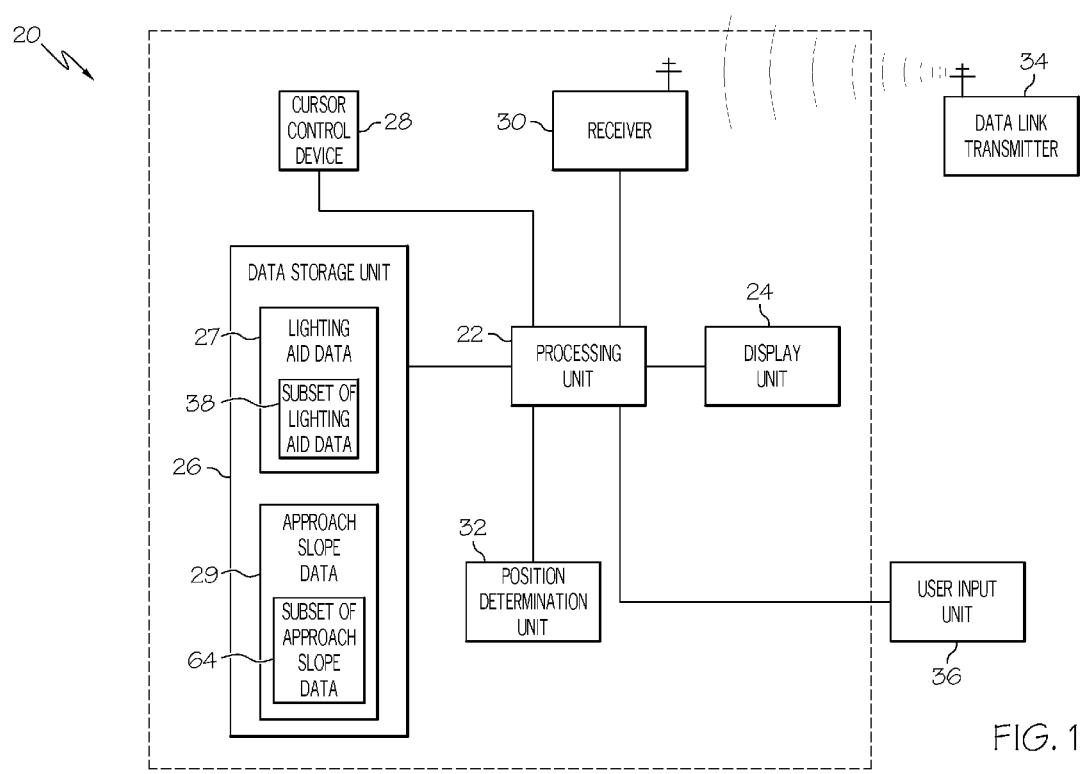
FIG. 1 is a schematic view illustrating a non-limiting embodiment of an airport lighting aid simulation system made in accordance with the teachings of the present disclosure.

The following detailed description is merely exemplary in nature and is not intended to limit the invention or the application and uses of the invention. Furthermore, there is no intention to be bound by any theory presented in the preceding background or the following detailed description.

Various non-limiting embodiments of an airport lighting aid simulation system are disclosed herein which address the problems described above. In at least one embodiment, the airport lighting aid simulation system includes a processing unit, a display unit available within a cockpit of an aircraft, and a data storage unit that is configured to store lighting aid data for multiple airports. The processing unit is operatively connected to the data storage unit and to the display unit and is configured to receive user inputs including inputs which identify a target airport and a target runway. Once the target airport and the target runway have been identified, the processing unit is configured to obtain a sub-set of the lighting aid data from the data storage unit. The sub-set of the lighting aid data includes data relating to the target runway and to a target runway lighting aid (i.e., an airport lighting aid that is employed at the target runway). In some embodiments, the sub-set of the lighting aid data includes information such as an alphanumeric designator for the target runway (e.g., 16R), an identification of the target runway lighting aid (e.g., a PAPI), and a location of the target runway lighting aid (e.g., the left side or the right side or both sides of the target runway).

Once the processing unit has retrieved the sub-set of the lighting aid data from the data storage unit, the processing unit controls the display unit to display a target runway description. As used herein, the term "target runway description" includes text or symbols/icons or a combination of text with symbols/icons that conveys information describing a configuration of the target runway including the target runway lighting aid and an orientation of the target runway lighting aid with respect to the target runway. When the target runway description is displayed on the display unit, a pilot of the aircraft is enabled to confirm that a visible runway and/or airport is the target runway and/or airport by comparing the view of the visible runway through the cockpit window with the target runway description. If the view of the visible runway differs from the target runway description (e.g., the target runway description may identify the target runway lighting aid as being a VASI that is located on the right side of the target runway while the view from the cockpit may reveal that a visible airport has a PAPI located on the left side of the visible runway), then the pilot is alerted to the possibility that the visible runway is not the target runway and may avoid landing at the visible runway or may take any further action needed to determine whether the visible runway is the target runway.

A greater understanding of the embodiments of the system disclosed herein may be obtained through a review of the illustrations accompanying this application together with a review of the detailed description that follows.

With respect to FIG. 1, an exemplary embodiment of an airport lighting aid simulation system 20 (hereinafter "system 20") is illustrated. In some embodiments, system 20 may be housed entirely on an aircraft. In other embodiments, system 20 may be partially housed on an aircraft and partially housed at one or more land based facilities including airports and/or an air traffic control facilities, with the various portions of system 20 being communicatively connected to one another via any suitable wireless communications system. In still other embodiments, system 20 may be partially housed on an aircraft and partially housed at a central location, for example, on a satellite in geosynchronous orbit above the earth, with the two portions being communicatively connected to one another via any suitable wireless communication system. Other housing configurations not specifically enumerated here are also possible.

In the illustrated embodiment, system 20 includes a processing unit 22, a display unit 24, a data storage unit 26, a cursor control device 28, a receiver 30, and a position determination unit 32. These components will be described in greater detail below. One of ordinary skill in the art will appreciate that other embodiments of system 20 may include a great or a lesser number of components. For example, other embodiments of system 20 may not include receiver 30, position determination unit 32, and/or cursor control device 28 while other embodiments may have multiple processing units 22, multiple data storage units 26 and/or multiple display units 24. In still other embodiments, any of the components of system 20 may be shared with other systems, either housed onboard an aircraft or housed externally thereto. A wide variety of other configurations not specifically enumerated here are also possible without departing from the teachings of the present invention.

Also shown in FIG. 1 is a data link transmitter 34 and a user input unit 36. These components are configured to provide inputs into system 20. Accordingly, various components of system 20 may be configured to communicate with data link transmitter 34 and user input unit 36. In some embodiments, data link transmitter 34 and/or and user input unit 36 may be housed together with system 20 or portions thereof. In other embodiments, data link transmitter 34 and/or user input unit 36 may be housed remotely from system 20. Data link transmitter 34 and user input unit 36 will be discussed in detail below.

In the embodiment illustrated in FIG. 1, processing unit 22 may be any suitable computer processor such as, for example, a microprocessor, a digital signal processor, or any other processor capable of at least receiving and/or retrieving data, calculating a result using the data, and controlling a display unit to display the result. Processing unit 22 may comprise multiple computer processors that are communicatively connected to one another over a local area network (LAN) or a wide area network (WAN). In some embodiments, processing unit 22 may be housed onboard an aircraft. In other embodiments, processing unit 22 may configured to wirelessly communicate with the aircraft employing system 20 and housed remotely at an airport, at an air traffic control facility, at a central location, or otherwise housed externally to the aircraft employing system 20. As discussed below, processing unit 22 is configured to receive user inputs from user input unit 36.

In the embodiment illustrated in FIG. 1, display unit 24 is a display medium available to a pilot in the cockpit of an aircraft. Display unit 24 may be any suitable type of medium capable of presenting visual images including, but not limited to, a primary flight display, a heads down display, a heads up display, a cathode ray tube display, an LED display, an LCD display, a plasma display, a projection display, a holographic display, a near to eye display, and/or any other type of display, presently known or hereafter invented. Display unit 24 is communicatively connected to processing unit 22. Any type of connection effective to transmit control signals from processing unit 22 to display unit 24 and/or feedback signals from display unit 24 back to processing unit 22 may be employed. For example, and without limitation, coaxial cables, transmission lines, microstrips, an input/output bus connection, and any type of wireless communication system, or any combination of the foregoing, may be employed to communicatively connect display unit 24 to processing unit 22.

In the embodiment illustrated in FIG. 1, data storage unit 26 is a data storage component that may be housed onboard the aircraft employing system 20. In other embodiments, data storage unit 26 may configured to wirelessly communicate with the aircraft employing system 20 and may be housed remotely at an airport, at an air traffic control facility, at a central location, or otherwise housed externally to the aircraft employing system 20. Data storage unit 26 is communicatively connected to processing unit 22. Any type of connection effective to transmit signals between processing unit 22 and data storage unit 26 may be employed. For example, and without limitation, coaxial cables, transmission lines, microstrips, an input/output bus connection, and any type of wireless communication system, or any combination of the foregoing, may be employed to communicatively connect data storage unit 26 to processing unit 22.

In the embodiment illustrated in FIG. 1, data storage unit 26 is an electronic memory device that is configured to store data. Data storage unit 26 may be any type of data storage component including, without limitation, non-volatile memory, disk drives, tape drives, and mass storage devices and may include any suitable software, algorithms and/or sub-routines that provide the data storage component with the capability to store, organize, and permit the retrieval of data. Data storage unit 26 is configured to store at least lighting aid data 27 relating to the airport lighting aids available at a plurality of airports and the airport lighting aids available at each runway of each airport. In the embodiment illustrated in FIG. 1, data storage unit 26 is further configured to store data related to a prescribed approach slope for each runway of each airport (hereinafter "approach slope data 29").

In the embodiment illustrated in FIG. 1, cursor control device 28 is an aircraft cockpit mounted device that is configured to receive inputs from a user and to transmit signals corresponding with the user inputs to another device. Examples of cursor control devices that are compatible with system 20 include, but are not limited to, a mouse, a track ball, a joy stick, a key board, a touch pad, a touch screen, a microphone, a camera, and a motion sensor. In some embodiments, cursor control device 28 may be incorporated into display unit 24. Cursor control device 28 is communicatively connected to processing unit 22. Any type of connection effective to transmit signals between cursor control device 28 and processing unit 22 may be employed. For example, and without limitation, coaxial cables, transmission lines, microstrips, an input/output bus connection, and any type of wireless communication system, or any combination of the foregoing, may be employed to communicatively connect cursor control device 28 to processing unit 22.

In the embodiment illustrated in FIG. 1, receiver 30 is an aircraft mounted device that is configured to receive target airport messages from data link transmitter 34 and to convey the target airport messages to processing unit 22. In some embodiments, data link transmitter 34 is located at each target airport and is configured to broadcast wireless signals to aircraft approaching the target airport. In other embodiments, data link transmitter 34 may be mounted on one or more satellites that are configured to broadcast information to receiver 30. In some embodiments, receiver 30 may be configured to receive radio frequency transmissions, satellite communication transmissions, optical transmissions, laser light transmissions, sonic transmissions or transmissions of any other wireless form of communication. Receiver 30 is communicatively connected to processing unit 22. Any type of connection effective to transmit signals between receiver 30 and processing unit 22 may be employed. For example, and without limitation, coaxial cables, transmission lines, microstrips, an input/output bus connection, and any type of wireless communication system, or any combination of the foregoing, may be employed to communicatively connect receiver 30 to processing unit 22.

In the embodiment illustrated in FIG. 1, position determination unit 32 is an aircraft mounted device that is configured to determine the aircraft's current position (e.g., latitude, longitude and/or altitude) and to provide the aircraft's current position to processing unit 22. Position determination unit 32 may comprise an onboard navigation system that can include, but which is not limited to, an inertial navigation system, a satellite navigation system (e.g., Global Positioning System) receiver, VLF/OMEGA, Loran C, VOR/DME, DME/DME, IRS, a Flight Management System (FMS), and/or an altimeter or any combination of the foregoing. Position determination unit 32 is communicatively connected to processing unit 22. Any type of connection effective to transmit signals between position determination unit 32 and processing unit 22 may be employed. For example, and without limitation, coaxial cables, transmission lines, microstrips, an input/output bus connection, and any type of wireless communication system, or any combination of the foregoing, may be employed to communicatively connect position determination unit 32 to processing unit 22.

In the embodiment illustrated in FIG. 1, data link transmitter 34 is a transmitter that is configured to wirelessly transmit airport messages. As used herein, the term "airport message" refers to data transmitted by data link transmitter 34 containing information relating to an airport, a runway and/or an aircraft approaching the airport or the runway. For example an airport message may comprise information indicating that either an airport or runway are closed. In another example, an airport message may comprise information indicating that an airport lighting aid is inoperative. In yet another example, an airport message may comprise information indicating that an aircraft is approaching an incorrect runway. These items of information may be uploaded to data link transmitter 34 by tower personnel, air traffic controllers, by an automated system, or by any other suitable source.

Data link transmitter 34 may be any suitable transmitter that is configured to wirelessly emit transmissions including, but not limited to, RF transmissions, satellite communication transmissions, optical transmissions, laser light transmissions and sonic transmissions. Data link transmitter 34 is disposed externally to the aircraft. In at least one embodiment, a plurality of data link transmitters 34 are positioned at a respective plurality of airports and are configured to transmit airport messages to approaching aircraft.

In the embodiment illustrated in FIG. 1, user input unit 36 is a component that is configured to permit a user, including, but not limited to, a pilot, a tower controller, and/or an air traffic controller to, input information into processing unit 22. For example, user input unit 36 may comprise a computer, key board, a touch screen, a microphone, a camera, or any other device or combination of devices which permit a user to input information into processing unit 22. In some embodiments, user input unit 36 may be an independent component while in other embodiments, user input unit 36 may integral with other components of system 20. In still other embodiments, a single component of system 20 may serve a dual role, one of which is service as user input unit 36. For example, a single component may serve as both cursor control device 28 and user input unit 36. In other examples, a single component may serve as both display unit 24 and user input unit 36.

Examples of information that a user may input into processing unit 22 include an identification of a target airport, a target runway, or multiple target airports and multiple target runways. In some embodiments, user input unit 36 may be housed onboard the aircraft and may be communicatively connect to processing unit 22. Any type of connection effective to transmit signals between user input unit 36 and processing unit 22 may be employed. For example, and without limitation, coaxial cables, transmission lines, microstrips, an input/output bus connection, and any type of wireless communication system, or any combination of the foregoing, may be employed to communicatively connect user input unit 36 to processing unit 22. In other embodiments, user input unit may be housed externally to the aircraft and configured to communicate wirelessly with the aircraft. For example, user input unit may be located at an airport tower and/or at an air traffic control facility. In such embodiments, system 20 may utilize receiver 30 to receive such transmissions or system 20 may include an additional receiver (not shown) for receiving user inputs from user input unit 36.

Figure 2:
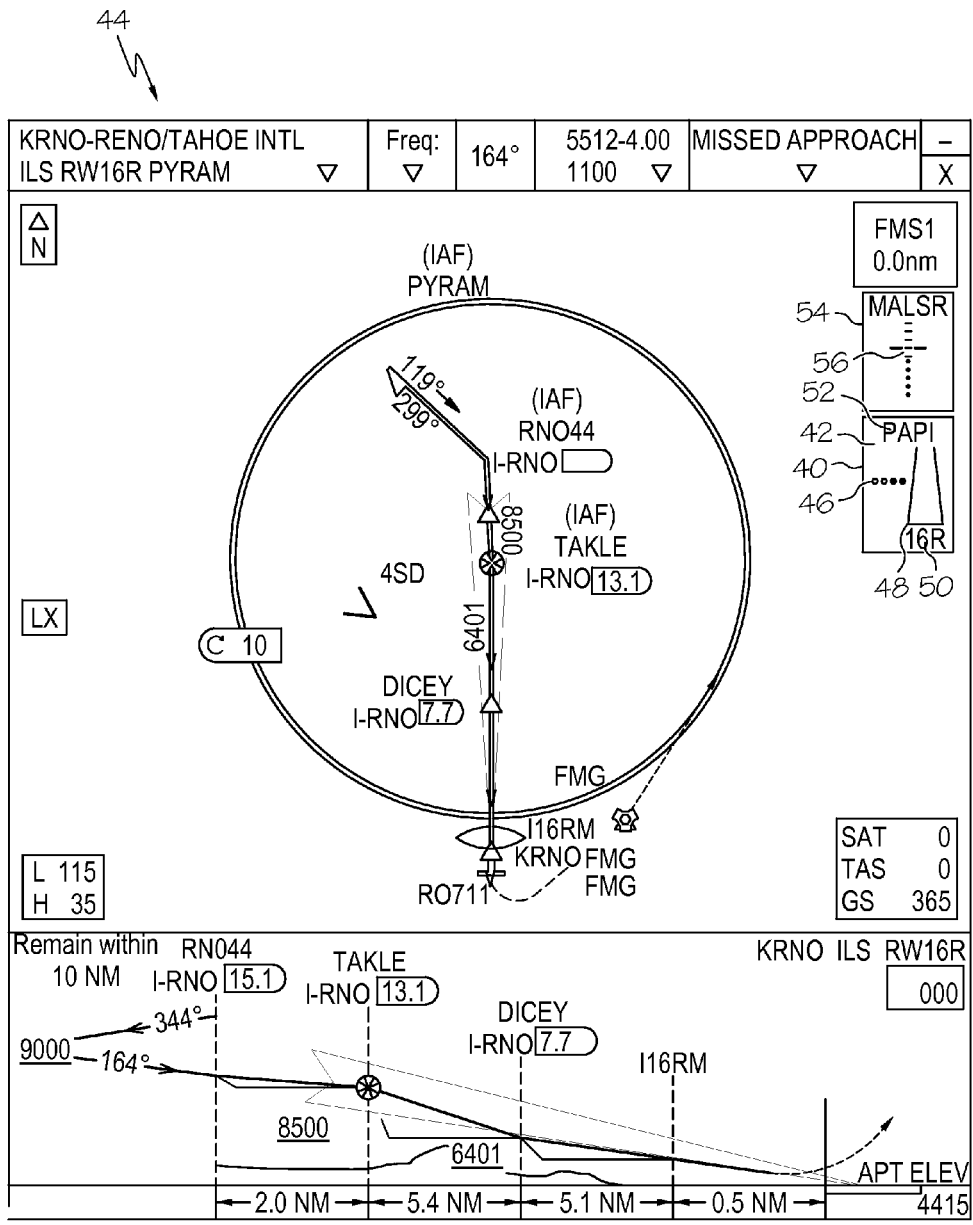
FIGS. 2-3 are examples of aircraft cockpit display screens that include windows containing information provided by the airport lighting aid simulation system of FIG. 1.
Figure 3:
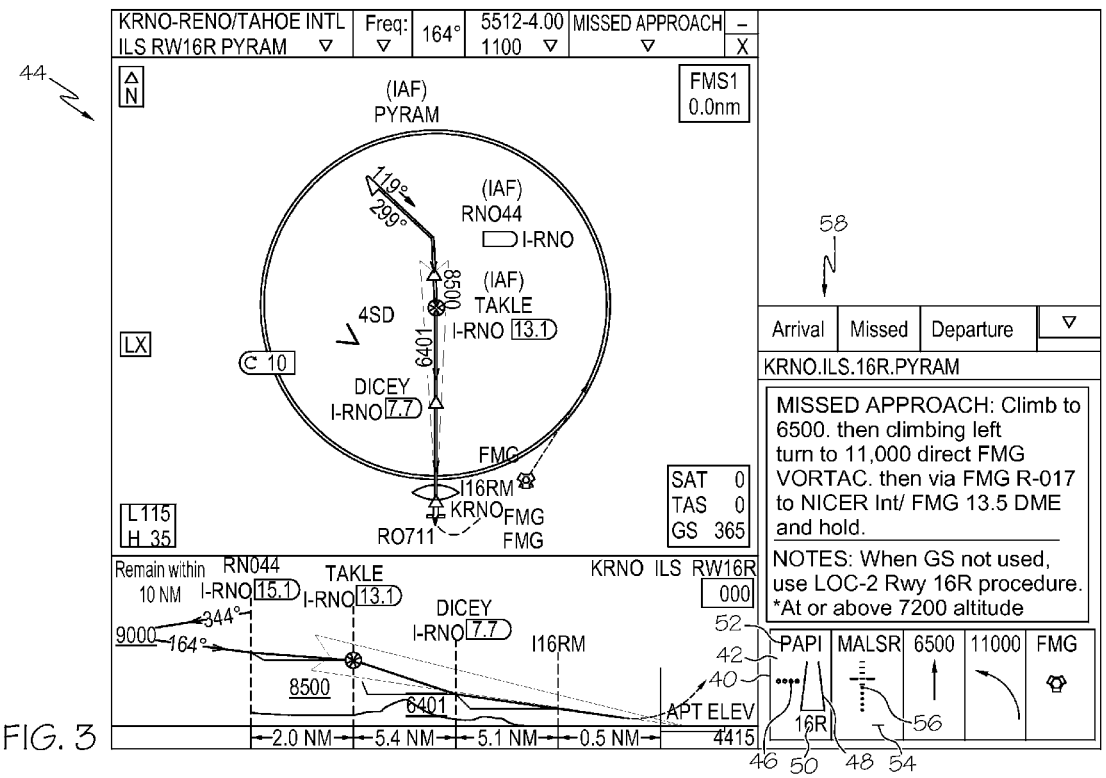

Referring to FIGS. 1-3, use and operation of a non-limiting embodiment of system 20 will now be discussed. To initiation operation of system 20, a user inputs information (hereinafter "user information") into system 20 using user input unit 36. User's include, but are not limited to, a pilot, a member of an aircraft flight crew, a tower controller, and/or an air traffic controller. The user information includes, but is not limited to, an identification of a target airport, and an identification of a target runway. The user may input the user information into system 20 prior to take off, during flight, prior to landing, or at any other suitable time.

As discussed above, user input unit 36 is communicatively connected to processing unit 22. User input unit 36 is configured to communicate with processing unit 22 and to provide processing unit 22 with information identifying the target airport and the target runway in response to receiving the user information. Processing unit 22 is configured to receive communications from user input unit 36.

In the illustrated embodiment, processing unit 22 is configured (i.e., processing unit 22 is loaded with, and operates, appropriate software, algorithms and/or sub-routines) to initiate communications with data storage unit 26 in response to receiving information identifying the target airport and the target runway from user input unit 36. Processing unit 22 is further configured to control data storage unit 26 to provide a sub-set of lighting aid data 38 (hereinafter, "lighting sub-set 38") from data storage unit 26. Lighting sub-set 38 includes airport lighting aid data related to the target airport and the target runway. For example, lighting sub-set 38 includes, but is not limited to, an identification of a specific type of approach lighting system used at the target runway, information indicative of the location of the approach lighting system with respect to the target runway (i.e., whether the approach lighting system is located on the left side or the right side, or on both sides of the runway) and the presence of a secondary target runway lighting aid (i.e., an MALSR). Data storage unit 26 provides lighting sub-set 38 to processing unit 22 via the communicative connection between data storage unit 26 and processing unit 22 discussed previously.

In the illustrated embodiment, processing unit 22 is further configured to receive lighting sub-set 38 from data storage unit 26. Upon receipt of lighting sub-set 38, processing unit 22 is configured to send commands to display unit 24 which cause display unit 24 to display a first window 40 containing a target runway description 42.

FIG. 2 illustrates an exemplary view of a display screen 44 of an exemplary display unit 24. Display screen 44 displays various items of data and information used by the pilot and/or other members of the flight crew during flight operations to enable, assist, or otherwise facilitate control of the aircraft. Processing unit 22 controls display unit 24 to display first window 40 in an upper right hand portion of display screen 44. In other embodiments, first window 40 may be positioned at any other suitable location on display screen 44. In still other embodiments, processing unit 22 and/or display unit 24 may be configured to receive inputs from a user indicative of a desired location for the display of first window 40 and may be further configured to control display unit 24 to move first window 40 to the indicated portion of display screen 44.

In the embodiment illustrated in FIG. 2, target runway description 42 includes an approach lighting system icon 46 (hereinafter "ALS icon 46"). ALS icon 46 is configured to resemble the light or patterns of light associated with the represented approach lighting system. For instance, in the embodiment illustrated in FIG. 2, ALS icon 46 includes four horizontally oriented circles which are representative of, and which resemble, a four-light PAPI. Each of other types of approach lighting systems may be represented by a unique icon resembling a respective approach lighting system.

In the embodiment illustrated in FIG. 2, target runway description 42 further includes a runway icon 48. Runway icon 48 includes two upwardly oriented lines which are canted so that their respective upper ends are closer to one another than their respective lower ends. The two upwardly oriented lines are joined at the bottom by a single horizontal line. This shape represents and resembles a runway when viewed while on approach from the air. In other embodiments runway icon 48 may have a different appearance to reflect any unique characteristics of the target runway.

In the embodiment illustrated in FIG. 2, ALS icon 46 is positioned in first window 40 to the left of runway icon 48. This orientation represents and resembles the actual orientation between the actual approach lighting system and the actual target runway. As discussed below, if the actual orientation between the approach lighting system and the target runway were different, the arrangement of ALS icon 46 and runway icon 48 with respect to one another would be arranged to resemble the different orientation.

In the embodiment illustrated in FIG. 2, target runway description 42 further includes a runway identifier 50 that identifies the target runway with alphanumeric characters. In the illustrated embodiment, runway identifier 50 includes the characters "16R" which is understood in aviation to identify the target runway as runway one six and which is oriented at an angle of one hundred and sixty degrees with respect to magnetic north. The "R" indicates that there are at least two parallel runways at the target airport and that the target runway is the runway on the right. Runways frequently have this alphanumeric identifier painted in large characters at the foot of each runway. These alphanumeric identifiers are visible from miles away and the inclusion of runway identifier 50 in first window 40 contributes to the pilot's ability to confirm that the aircraft is approaching the target runway.

In the embodiment illustrated in FIG. 2, target runway description 42 further includes an ALS identifier 52 that identifies the type of approach lighting system available at the target runway with alpha numeric characters. In the illustrated embodiment, ALS identifier 52 includes the characters "PAPI" to inform the pilot or other member of the air crew that the type of approach lighting system employed at the target runway is a PAPI.

In other embodiments, target runway description 42 may not include ALS icon 46 and runway icon 48. Rather, in other embodiments, target runway description 42 may comprise only one of these icons and text to describe the other. In still other embodiments, target runway description 42 may not include either of these icons, but rather may use text exclusively. In still other embodiments, target runway description 42 may not be visual, but rather may comprise an audible description of the target runway, the target airport and the associated target runway lighting aid. In still other embodiments, any other method or mechanism or combination thereof that is effective to communicate a description to the pilot of the target runway, the target airport and the associated target runway lighting aid may be employed by system 20.

In the embodiment illustrated in FIG. 2, the target airport provides an MALSR in addition to a four light PAPI. When a target runway includes a secondary target runway lighting aid, such as an MALSR, lighting sub-set 38 includes information indicative of the presence of such a secondary target runway lighting aid at the target runway. Processing unit 22 is configured to recognize the indication of a secondary target runway lighting aid in lighting sub-set 38. As illustrated in FIG. 2, processing unit 22 is further configured to send commands to display unit 24 which cause display unit 24 to display a second window 54 containing a secondary target runway lighting aid icon 56 (hereinafter "secondary lighting icon") that is representative of the secondary target runway lighting aid.

The presentation of first window 40 and the target runway description 42 contained therein enables a pilot to confirm whether a visible runway is the target runway by informing the pilot as to what the view from the cockpit should look like. If the view of the visible runway differs from target runway description, then the pilot is alerted to the possibility that the aircraft is approaching the wrong runway or the wrong airport. The presentation of second window 54 displaying secondary target runway lighting aid icon 56 provides further information that the pilot may use to confirm whether or not the aircraft is approaching the target runway at the target airport.

With respect to FIG. 3, an alternate embodiment is presented. In FIG. 3, display screen 44 displays the various items of data and information used by the pilot and/or other members of the flight crew during flight operations to enable, assist, or otherwise facilitate control of the aircraft, but omits first window 40 and second window 54. In this alternate embodiment, first window 40 and second window 54 are displayed on a secondary display screen 58. In the embodiment illustrated in FIG. 3, secondary display screen 58 is disposed adjacent display screen 44. In still other embodiments, secondary display screen 58 may be spaced apart from display screen 44 or may be located elsewhere within the cockpit of the aircraft in a position remote from display screen 44. In still other embodiments, the image displayed on display screen 44 and the image displayed on secondary display screen 58 may comprise two separate windows on a single display screen. Other configurations are also possible. In the embodiment of FIG. 3, first window 40 and second window 54 are displayed together with several other windows that contain guidance relating to a missed approach procedure. In other embodiments, first window 40 and second window 54 may be displayed alone or with different windows providing additional information.

With reference to FIGS. 1, and 4-6, processing unit 22 is further configured to control display unit 24 to display a cursor 60 (See FIGS. 4-6) on display screen 44 and/or secondary display screen 58. Cursor control device 28 is configured to receive cursor control inputs from a user and to communicate the cursor control inputs to processing unit 22. Processing unit 22 is configured to receive the cursor control inputs and is further configured to send commands to display unit 24 which cause display unit 24 to move cursor 60 across display screen 44 and/or secondary display screen 58. In this manner, a user is enabled to control the location of cursor 60 on display screen 44 and/or secondary display screen 58.

When a user positions cursor 60 over first window 40 or second window 54, processing unit 22 is configured to detect such positioning of cursor 60 and is further configured to control display unit 24 to temporarily display an additional window 62. Additional window 62 may be displayed in close proximity to first window 40 and to second window 54 on display screen 44 or secondary display screen 58, respectively. In other embodiments, additional window 62 may be displayed in any suitable location on display screen 44 and/or secondary display screen 58. In still other embodiments, additional window 62 may be displayed on additional or separate display screens in the cockpit of the aircraft. In the illustrated embodiment, additional window 62 contains additional information pertaining to the information presented in first window 40 and/or second window 54.

The additional information presented in additional window 62 may include symbols, icons and/or text. In the examples illustrated in FIGS. 4 and 5, additional window 62 contains a textual description of target runway description 42. For instance, with respect to FIG. 4, the information provided in additional window 62 indicates that the target runway utilizes a four light PAPI that is disposed on the left side of runway one six right and further indicates that an appropriate approach to runway one six right requires the use of a 3.10 degree glide slope. With respect to FIG. 5, the information provided in additional window 62 indicates that the target runway utilizes a two-bar VASI that is disposed on the right side of runway one two left and further indicates that an appropriate approach to runway one two left requires the use of a 3.00 degree glide slope.

Figure 6:
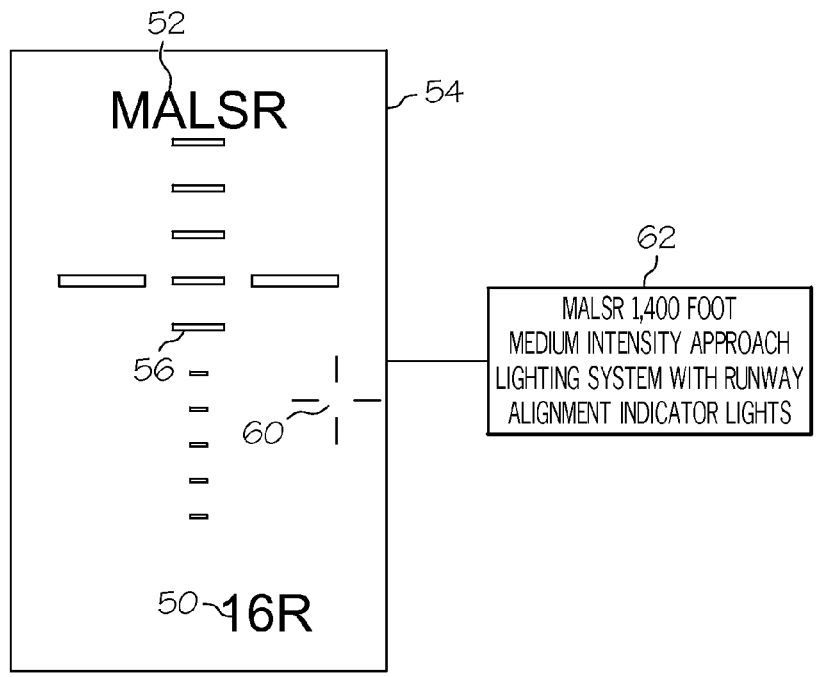

With respect to FIG. 6, an exemplary second window 54 is illustrated. Cursor 60 is disposed over second window 54 and additional window 62 opens to provide additional information related to the secondary target runway lighting aid available at the target runway. In the illustrate example, additional window 62 contains text indicating that the target runway utilizes a 1,400 foot MALSR with runway alignment indicator lights.

When a user moves cursor 60 off of first window 40 and/or off of second window 54, processing unit 22 is configured to detect this movement and to control display unit 24 to cause additional window 62 to disappear. In other embodiments, processing unit 22 may be configured to cause additional window 62 to automatically disappear after a predetermined period of time has lapsed.

Some embodiments of system 20 include receiver 30 for wirelessly receiving target airport messages from data link transmitter 34. In some embodiments, receiver 30 may passively listen for target airport messages which are automatically transmitted by data link transmitter 34. In other embodiments of system 20, receiver 30 may comprise a transceiver or system 20 may further include a transmitter that permits system 20 to interrogate data link transmitter 34 as the aircraft approaches the target airport. Such interrogation can occur automatically or may be initiated by the pilot or by other members of the flight crew.

Target airport messages may include information regarding a condition of the target airport (i.e., airport closures), a condition of the target runway (i.e. runway closures and/or inoperability of a target runway's approach lighting system), and/or a condition of an aircraft approaching the target airport (i.e., that the aircraft is approaching an incorrect runway at the target airport). When received, receiver 30 is configured to forward the target airport message to processing unit 22. Processing unit 22 is configured to receive the target airport message from receiver 30 and to issue commands to control display unit 24 to display the target airport message.

Figure 7:
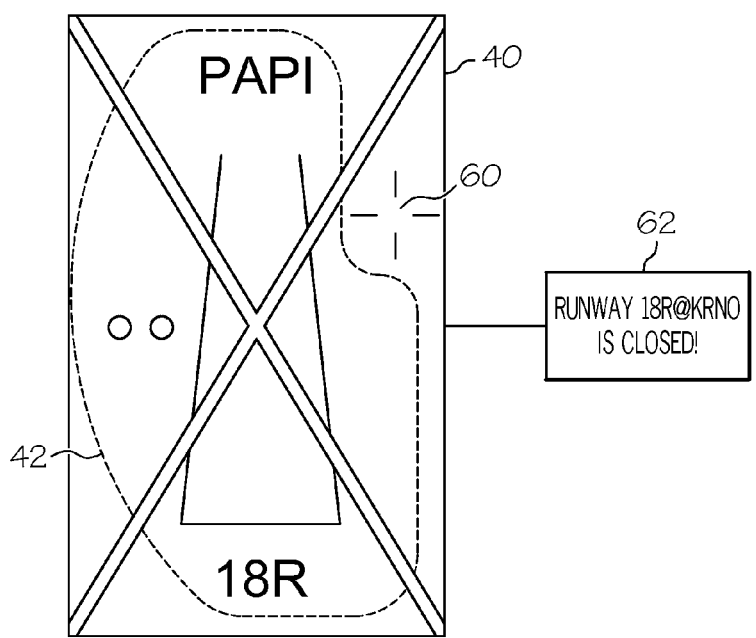
FIG. 7-9 are examples of windows which may be displayed on the aircraft cockpit display screens of FIGS. 2-3 and which contain a target runway description and/or a target airport message provided by the airport lighting aid simulation system of FIG. 1.
Figure 8:
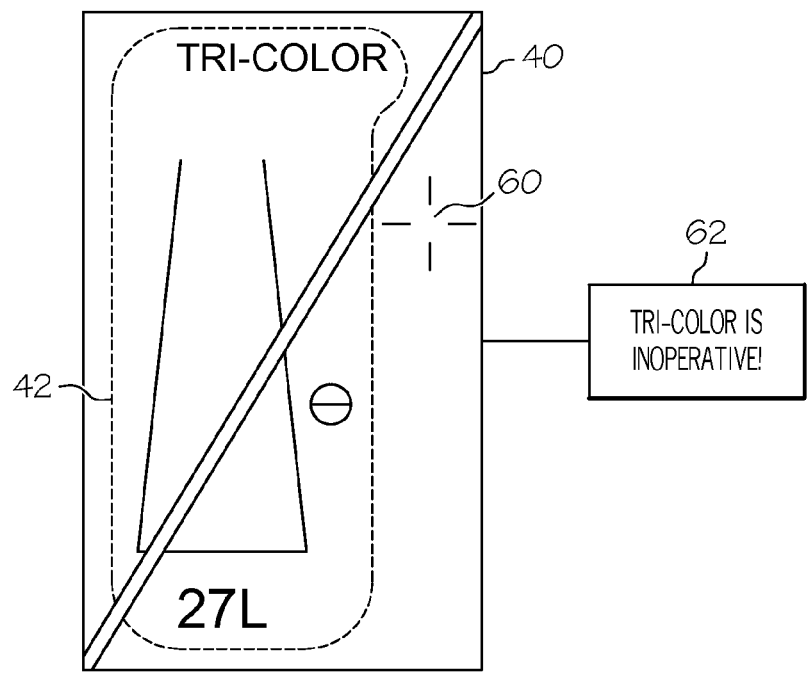
Figure 9:
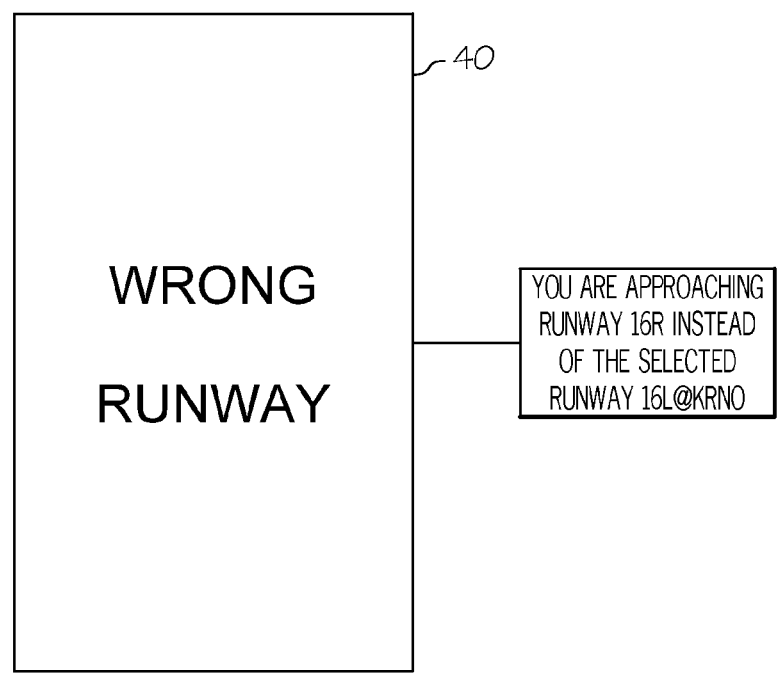

FIGS. 7-9 illustrate the display of differing airport messages in first window 40. With respect to FIG. 7, first window 40 displays an "X" disposed over target runway description 42. The use of the symbol "X" is intended to alert a pilot of an aircraft to the fact that either the target runway or the entire target airport is closed, and that the pilot should not proceed with the landing. In FIG. 8, first window 40 displays a slash through target runway description 42. The use of the slash is intended to alert a pilot of an aircraft to the fact that the approach lighting system for the target runway is inoperative and that the pilot should not rely on it to accomplish the landing. In FIG. 9, first window 40 does not display the target runway description at all, but instead displays only text which reads "WRONG RUNWAY" in all capital letters. This is to alert the pilot of an aircraft on approach to the target airport that the aircraft is lined up to land on a runway other than the target runway. A pilot lined up to land on a taxiway instead of the target runway may also see this message in first window 40. The use of an "X", a slash, and text are intended to be exemplary only and may be interchanged in any manner, or may be substituted with other symbols, icons and/or text that are effective to communicate the airport message to the pilot.

Additionally, in some embodiments of system 20, if the pilot positions cursor 60 over first window 40 while the airport message is displayed in first window 40, additional window 62 will not contain information pertaining to the target runway description, but rather will provide information relating to the target airport message. For instance, additional window 62 may contain text explicitly stating the airport message.

In embodiments equipped with position determination unit 32, system 20 is configured to include with target runway description 42, information that is indicative of the aircraft's deviation from the appropriate glide slope as the aircraft approaches the target runway. In the illustrated embodiment, position determination unit 32 is configured to determine the position of the aircraft at regular intervals and to provide such positional information to processing unit 22. Such information may include the aircraft's current longitude and latitude, heading, altitude, angle of attack, rate of descent, and any other information relating to the position of the aircraft and/or its heading.

Processing unit 22 is configured to receive positional information from position determination unit 32 and is further configured to initiate communications with data storage unit 26 in response to receiving such positional information. Processing unit 22 is further configured to control data storage unit 26 to provide a sub-set of approach slope data 64 (hereinafter, "approach sub-set 64") from data storage unit 26. Approach sub-set 64 includes approach slope data related to the target runway. For example, approach sub-set 64 includes, but is not limited to, an identification of the prescribed glide slope for aircraft approaching the target runway. Data storage unit 26 provides approach sub-set 64 to processing unit 22 via the communicative connection between data storage unit 26 and processing unit 22 discussed previously.

In the illustrated embodiment, processing unit 22 is further configured to receive approach sub-set 64 from data storage unit 26. Upon receipt of approach sub-set 64, processing unit 22 is configured to compare the current position of the aircraft with an expected position of an aircraft following the prescribed glide slope. Processing unit 22 is further configured to determine the deviation, if any, of the current position of the aircraft from the expected position. Processing unit 22 is further configured to send commands to display unit 24 which cause display unit 24 to display ALS icon 46 in a manner that is reflective of the deviation of the aircraft from the expected position on the glide slope.

Figure 4:
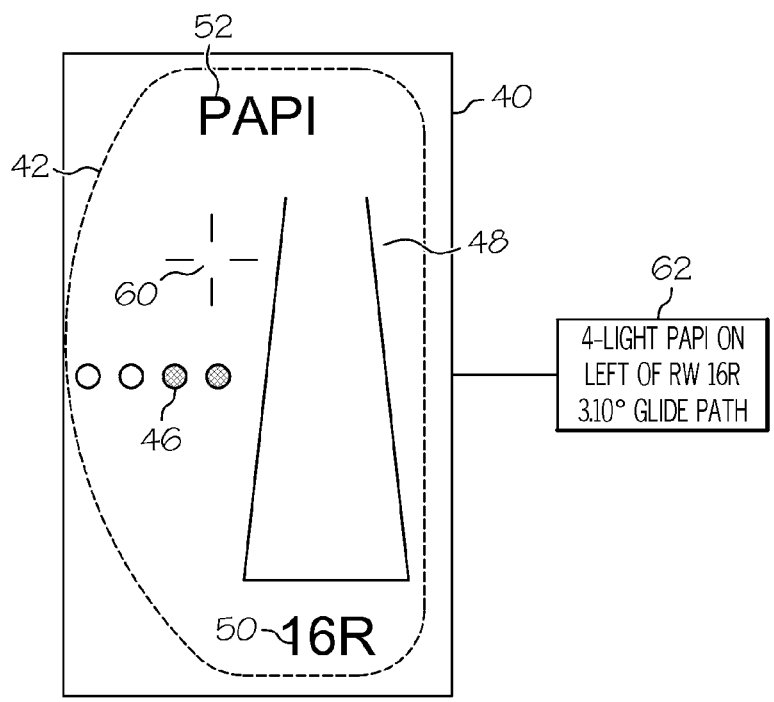
FIGS. 4-6 are examples of windows which may be displayed on the aircraft cockpit display screens of FIGS. 2-3 and which contain a target runway description provided by the airport lighting aid simulation system of FIG. 1.
Figure 5:
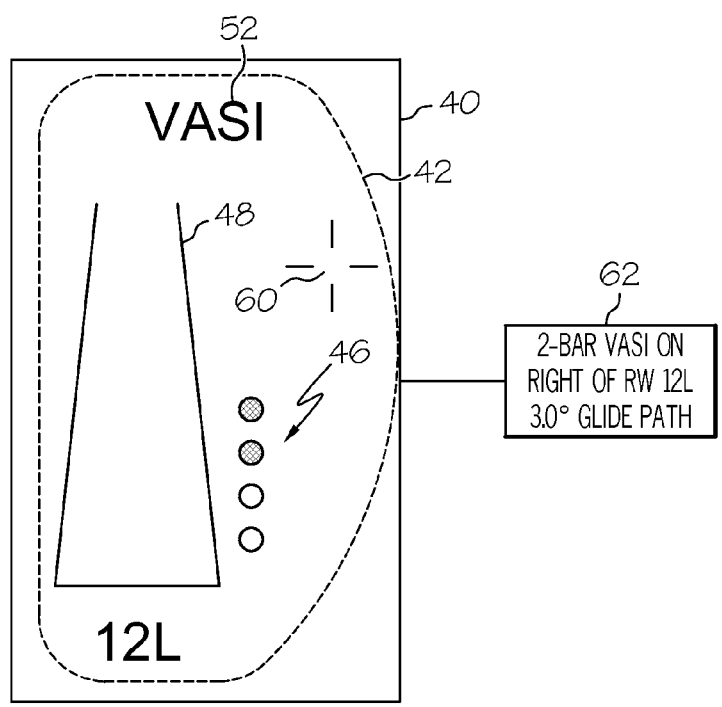

For example, if an aircraft is at the proper position on the glide slope to the target runway, then ALS icon 46 would be illuminated in a manner correlating to the manner in which the actual approach lighting system in use at the target runway would be illuminated. This is illustrated in FIGS. 4 and 5. In FIG. 4, the target runway employs a four-light PAPI. The pilot of an aircraft properly aligned on the glide path to the target runway of FIG. 4 would see the two lights closest to the runway illuminated in red and the two lights furthest from the runway illuminated in white. Accordingly, ALS icon 46 of such an aircraft would mimic the view from the cockpit by illuminating the two lights closest to runway icon 48 in red and illuminating the two lights furthest from runway icon 48 in white. A similar result is depicted in FIG. 5, where ALS icon 46 is representative of a two-bar VASI. The pilot of an aircraft properly aligned on the glide path to the target runway would see the two lights furthest from the aircraft illuminated in red and the two lights closest to the aircraft illuminated in white. Accordingly, ALS icon 46 of such an aircraft would mimic the view from the cockpit by illuminating the two upper lights in red and illuminating the two lower lights in white. In other examples, where aircraft are out of their expected positions on the glide path, ALS icon 46 would illuminated in a manner that would be reflective of the illumination pattern of the lights of the approach runway system in use at the target runway. The coincidence of the illumination of ALS icon 46 with the actual approach lighting system employed at the target runway provides the pilot with additional confirmation that the aircraft is approaching the target runway.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An airport lighting aid simulation system comprising:
    a data storage unit configured to store lighting aid data relating to a plurality of airports, the lighting aid data being indicative of a type and a location of an airport lighting aid available at a runway at each airport of the plurality of airports;
    a display unit; and
    a processing unit operatively connected to the data storage unit and to the display unit, the processing unit being configured:
        to receive an input signal indicative of a target runway at a target airport,
        to retrieve a sub-set of the lighting aid data from the data storage unit, the sub-set of the lighting aid data relating to a target runway lighting aid, and
        to control the display unit to display a target runway description based on the sub-set of the lighting aid data,
    whereby a pilot is enabled to determine whether a visible runway is the target runway by comparing a view from an aircraft as the aircraft approaches the visible runway with the target runway description.

2. The airport lighting aid simulation system of claim 1 wherein the target runway description is displayed in a first window, the target runway description comprising at least one symbol representing the view from the aircraft on approach to the target runway.

3. The airport lighting aid simulation system of claim 2 wherein the processing unit is further configured to control the display unit to display at least one symbol representing a secondary target runway lighting aid in a second window.

4. The airport lighting aid simulation system of claim 2 further comprising a cursor control device (CCD) operatively connected to the processing unit and configured to receive user inputs, wherein the processing unit is further configured to control the display unit to display a cursor and to move the cursor in response to the user inputs and to further control the display unit to display text relating to the target runway when the cursor is positioned over the first window.

5. The airport lighting aid simulation system of claim 4 wherein the processing unit is further configured to control the display unit to display at least one symbol representing a secondary target runway lighting aid in a second window and wherein the processing unit is further configured to control the display unit to display text relating to the secondary target runway lighting aid when the cursor is positioned over the second window.

6. The airport lighting aid simulation system of claim 1 wherein the target runway description includes a target runway symbol and a target runway lighting aid symbol, and wherein the target runway symbol and the target runway lighting aid symbol are arranged to depict an orientation of the target runway lighting aid with respect to the target runway.

7. The airport lighting aid simulation system of claim 1 wherein the target runway description includes text identifying the target runway.

8. The airport lighting aid simulation system of claim 1 wherein the target runway description includes text identifying the target runway lighting aid.

9. An airport lighting aid simulation system for use in conjunction with a data link configured to provide a message, the airport lighting aid simulation system comprising:
    a data storage unit configured to store lighting aid data relating to a plurality of airports, the lighting aid data being indicative of a type and a location of an airport lighting aid available at a runway at each airport of the plurality of airports;
    a display unit;
    a receiver for receiving transmissions from the data link; and
    a processing unit operatively connected to the data storage unit, to the display unit, and to the receiver, the processing unit being configured:
        to receive an input signal indicative of a target runway at a target airport,
        to retrieve a sub-set of the lighting aid data from the data storage unit, the sub-set of the lighting aid data relating to a target runway lighting aid,
        to obtain a target airport message from the receiver, and
        to control the display unit to display a target runway description based on the sub-set of the lighting aid data and to display the target airport message,
    whereby a pilot is enabled to determine whether a visible runway is the target runway by comparing a view from an aircraft as the aircraft approaches the visible runway with the target runway description.

10. The airport lighting aid simulation system of claim 9 wherein the target runway description is displayed in a first window, the target runway description comprising at least one symbol representing the view from the aircraft on approach to the target runway and wherein the processing unit is further configured to control the display unit to display the target airport message in the first window.

11. The airport lighting aid simulation system of claim 10 wherein the processing unit is further configured to control the display unit to display an "X" in the first window when the target airport message comprises information indicating that at least one of the target runway and the target airport is closed.

12. The airport lighting aid simulation system of claim 10 wherein the processing unit is further configured to control the display unit to display a slash in the first window when the target airport message comprises information indicating that the target runway lighting aid is inoperative.

13. The airport lighting aid simulation system of claim 10 wherein the processing unit is further configured to control the display unit to display text in the first window indicating that the aircraft is approaching a wrong runway when the target airport message comprises information indicating that the aircraft is approaching a runway other than the target runway.

14. The airport lighting aid simulation system of claim 10 wherein the processing unit is further configured to control the display unit to display at least one symbol representing a secondary target runway lighting aid in a second window.

15. The airport lighting aid simulation system of claim 10 further comprising a cursor control device (CCD) operatively connected to the processing unit and configured to receive user inputs, wherein the processing unit is further configured to control the display unit to display a cursor and to move the cursor in response to the user inputs and to further control the display unit to display text relating to the target runway when the cursor is positioned over the first window.

16. The airport lighting aid simulation system of claim 15 wherein the processing unit is further configured to control the display unit to display at least one symbol representing a secondary target runway lighting aid in a second window and wherein the processing unit is further configured to control the display unit to display text relating to the secondary target runway lighting aid when the cursor is positioned over the second window.

17. The airport lighting aid simulation system of claim 9 wherein the target runway description includes a target runway symbol, a target runway lighting aid symbol, and wherein the target runway symbol and the target runway lighting aid symbol are arranged to depict an orientation of the target runway lighting aid with respect to the target runway.

18. The airport lighting aid simulation system of claim 9 wherein the target runway description includes text identifying the target runway.

19. The airport lighting aid simulation system of claim 9 wherein the target runway description includes text identifying the target runway lighting aid.

20. An airport lighting aid simulation system comprising:
a data storage unit configured to store lighting aid data relating to a plurality of airports, the lighting aid data being indicative of a type of airport lighting aid available at a runway at each airport of the plurality of airports, the data storage unit being further configured to store approach slope data relating to the plurality of airports, the approach slope data being indicative of an appropriate approach slope to the runway at each airport of the plurality of airports;
a position determination unit configured to determine a current position of an aircraft;
a display unit; and
a processing unit operatively connected to the data storage unit, to the position determination unit, and to the display unit, the processing unit being configured:
to receive an input signal indicative of a target runway at a target airport,
to retrieve a sub-set of the lighting aid data from the data storage unit, the sub-set of the lighting aid data relating to a target runway lighting aid,
to retrieve a sub-set of the approach slope data from the data storage unit, the sub-set of the approach slope data being indicative of the appropriate approach slope to the target runway,
to retrieve position information from the position determination unit, the position information being indicative of the current position of the aircraft,
to compare the position information with the sub-set of the approach slope data to determine whether the aircraft is on the appropriate approach slope to the target runway;
to control the display unit to display a target runway description and to display a pattern of indicators simulating the target runway lighting aid and to illuminate the pattern of indicators in a manner indicative of a deviation of the aircraft from the appropriate approach slope to the target runway,
whereby a pilot is enabled to determine whether a visible runway is the target runway by comparing a view from the aircraft as the aircraft approaches the visible runway with the target runway description and whereby the pilot is further enabled to determine whether the aircraft is on the appropriate approach slope to the target runway by observing the pattern of indicators displayed on the display unit.

* * * * *